April 11, 1961   P. WARGO   2,979,659
ELECTRICAL INDICATING INSTRUMENT
Filed Sept. 6, 1957
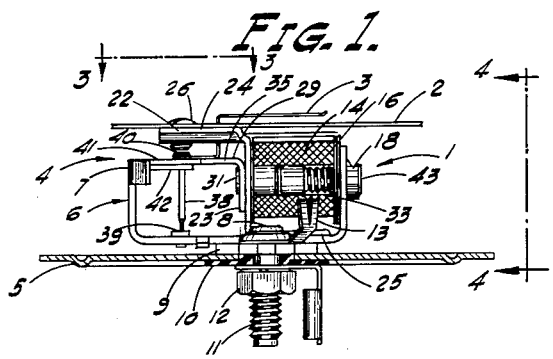
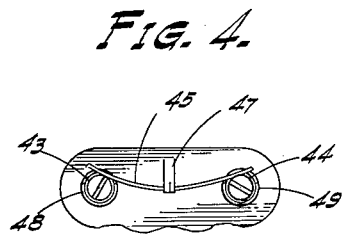
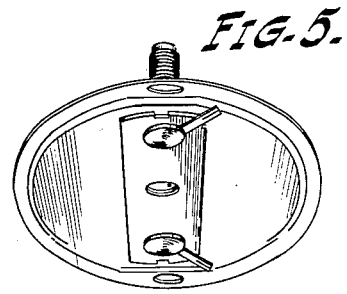
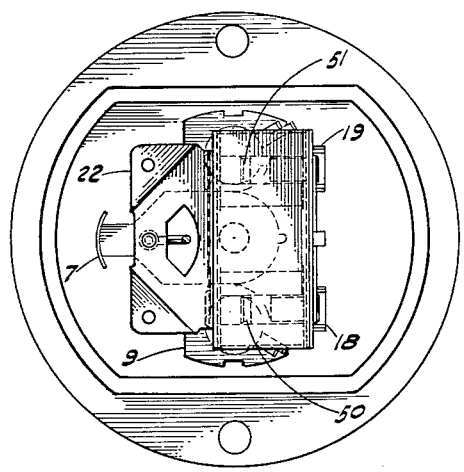
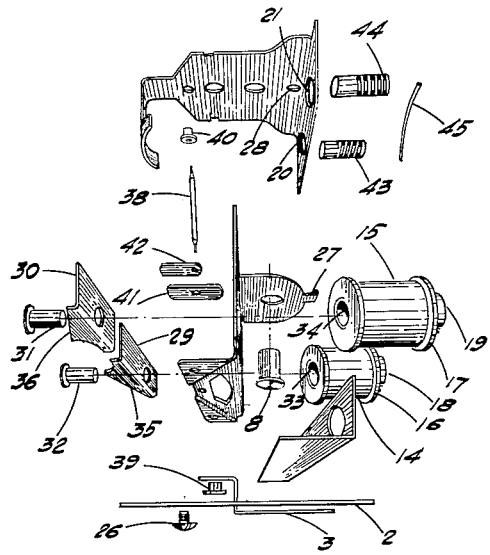
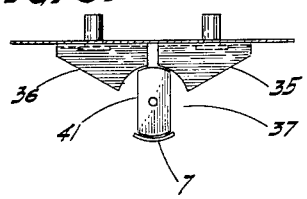
INVENTOR
PETER WARGO
By John C. Black
ATTORNEY ized by the aforementioned methods of calibration has contributed to mechanical failures and higher costs where the gauge is used for heavy duty applications on trucks, tractors and the like. For example, where calibration is attained by moving two complete electromagnetic coil subassemblies, the suspension of each subassembly is generally limited to a single stud or screw which not infrequently fails or permits deviation from the preset calibration under severe shock loads. I propose to provide a unitary construction, in which the coils, the frame, and the magnetic circuit are mounted permanently in position in a single assembly that can withstand the severe shocks experienced in heavy duty equipment.

United States Patent Office 2,979,659
Patented Apr. 11, 1961

2,979,659
ELECTRICAL INDICATING INSTRUMENT
Peter Wargo, Maywood, Ill., assignor to Stewart-Warner Corporation, Chicago, Ill., a corporation of Virginia
Filed Sept. 6, 1957, Ser. No. 682,474
8 Claims. (Cl. 324—140)

This invention relates generally to electrical indicating instruments and more particularly to an electromagnetic gauge. The preferred embodiment of the present invention has been especially adapted for use as a high quality vehicle gauge. However, it is to be understood that the invention is not to be limited thereby.

In the vehicle instrument field, the more costly high quality gauges have been of the voltage compensated electromagnetic type in which a pair of coils are connected in parallel across a source of voltage, that is the vehicle battery, in which a variable resistance is connected in series with one of the coils, in which a means controlled by a condition such as the amount of fuel in the vehicle storage tank selectively adjusts the resistance in accordance with the condition, and in which a magnetic operating means including a rotatable armature and magnetic circuits for the coils is controlled by the current flowing in the coils to operate a visual condition indicating means.

In the past, calibration of this type of gauge has been attained by varying the air gap between the electromagnetic pole structures and the moving armature. This has been attained either by shifting the pole pieces alone or by moving the complete electromagnetic coil assembly. This method obviously alters the contour of the air gap to cause nonlinearity of the indicating scale and other associated problems.

I propose to achieve very accurate calibration in this type of gauge by the simple, exceedingly accurate, and inexpensive expedient of altering the permeability of the electromagnetic circuit. This is achieved by providing an adjustable gap in the internal core structure of the electromagnetic coil. The functional air gap adjacent the moving armature is not altered.

Prior art constructions have been plagued alternatively by low torque or excessive magnetic lag. The term "magnetic lag" refers to the inherent characteristic of a non-permanent magnetic material to have a different flux density at a given value of magnetomotive force depending upon whether the force has been increased or decreased to said value. This difference in flux density is typically shown in hysteresis curves. This magnetic lag in non-permanent magnetic materials is increased as the length of the magnetic material is increased. Whenever the reluctance of the magnetic circuit is decreased to obtain greater torque for a given power input, the magnetic lag of the circuit is increased unduly. To overcome excessive magnetic lag while retaining satisfactory torque, manufacturers generally introduced excessive input power and magnetic circuit elements of costly special alloys. I propose to provide an improved magnetic circuit and assembly construction in which no special alloy is required and in which magnetic lag is reduced without proportionately reducing the torque for a given input power. This is achieved by a low cost, single assembly frame and magnetic circuit construction in which air gaps are introduced at spaced positions along the internal and external flux paths.

Thus, the proposed construction lends itself to a much more economical and reliably accurate construction due in no small part to the numerous features such as the simplified calibration and assembly techniques and the simplified solution to the problem of undue magnetic retention.

Certain of the economies achieved by the proposed construction can be attributed in part to its simple unitary assembly arrangement. In prior art assemblies, it has been common to first assemble somewhat complex coil subassemblies at considerable cost on a production line. Each of the subassemblies is in turn assembled into a complete assembly in another operation at another point on the line at the expense of undue assembly time. Consequently, production assembly costs are inherently necessarily high and unavoidable. Some attempts to simplify the assembly techniques and thus reduce cost and increase strength have resulted in the necessity of using high cost special alloys, defeating to a large extent the cost reduction intended.

Accordingly, it is an object of the present invention to provide an improved, more economical indicating instrument.

It is a further object of the present invention to provide a more economical, voltage-compensated electromagnetic gauge for vehicle use which is unusually rugged, reliable, and easily and accurately adjustable.

It is a further object of the present invention to provide a quality vehicle gauge adapted to low cost mass production techniques.

A features by which the above objects are achieved is the provision of a unitary, single assembly instrument.

An additional feature is the provision of an adjustable two-element magnetic core for each coil for simplicity of calibration.

An additional feature is the provision of spaced gaps in the internal and external electromagnetic flux circuits for minimizing magnetic lag.

Other objects and features will be evident upon the perusal of the following description in which:

Fig. 1 is an elevation view of the improved instrument;

Fig. 2 is a plan view of the instrument;

Fig. 3 is a partial plan view of the armature and pole pieces of the instrument;

Fig. 4 is a partial elevation view of the calibration means; and

Fig. 5 is an exploded perspective view of the components of the instrument.

With particular reference to Fig. 1, it can be seen that the gauge 1 includes a face dial 2 with an appropriately marked scale (not shown), an indicating pointer 3 cooperating with the scale, an electromagnetic moving vane mechanism 4, and a mounting plate 5.

The voltage responsive mechanism 4 includes an irregular generally U-shaped frame 6 of a nonpermanent magnetic material. The left hand side (Fig. 1) of the frame 6 includes an arcuate projection 7 at the upper end thereof. The projection 7 forms one pole piece of the mechanism 4. The frame 6 is rigidly secured to the mounting plate 5 by means of a rivet 8.

An insulating plate 9 held between the frame 6 and the mounting plate 5 and a pair of disk-like gaskets 10 of a suitable insulating material pressed into the plate 5 on either side of the frame 6 provide an electrically insulated mounting for a pair of terminal studs 11. The studs 11 are inserted through apertures in the insulating plate 9 and the gaskets 10 and are firmly held in place by nuts 12. A pair of terminal lugs 13 are secured to the insulating strip 9 by means of the terminal studs 11. Suitable electrical connections are made between the terminal lugs 13 and a pair of coils 14 and 15.

The coils 14 and 15 are supported by the right hand side (Fig. 1) of the frame 6. More specifically, the coils 14 and 15 are wound on conventional nylon forms 16 and 17, respectively. The forms 16 and 17 have a pair of annular projections 18 and 19 at their right hand ends (Fig. 1). The projections 18 and 19 are inserted through circular apertures 20 and 21 (Fig. 5) of the frame 6, each of the projections 18 and 19 having a cut away segment at its upper end for a purpose to be described later.

The opposite ends of the coil forms 16 and 17 are supported by a bracket 22 which has an upwardly extending (Fig. 1) section 23 and a pair of horizontal projections 24 and 25 extending in opposite directions from the top and bottom of the section 23. The projection 24 of the bracket 22 is suitably secured to the face dial 2 by means of rivets 26. The lower projection 25 of the bracket 22 is suitably secured to the frame 6 by means of the rivet 8, which as mentioned above secured the frame 6 to the plate 5. An L-shaped projection 27 (Fig. 5) on the bracket 22 engages an aperture 28 in the base of the frame 6 to hold the bracket in position relative to the frame. The bracket 22 may be made from any suitable nonmagnetic material, for example, brass.

A pair of generally L-shaped magnetic elements 29 and 30 are rigidly secured to the vertical (Fig. 1) section 23 of the bracket 22 by means of magnetic core elements 31 and 32. The cores 31 and 32 are inserted into axial bores 33 and 34 respectively of the coil forms 16 and 17, and the left hand ends (Fig. 1) of the cores 31 and 32 are staked over the elements 29 and 30 to hold them rigidly in place against bracket 22.

The upper horizontal (Fig. 1) legs 35 and 36 of the elements 29 and 30 form generally arcuate pole pieces at their outer extremities as best shown in Fig. 3 which match the arcuate pole piece 7 of the frame 6 to form a generally circular flux air gap 37.

The base of the frame 6 and the upper horizontal (Fig. 1) leg 24 of the bracket 22 rotatably carry a vertical pivot shaft 38 in a pair of bearings 39 and 40. The upper (Fig. 1) bearing 40 is in the form of an adjustable threaded screw for adjusting the optimum end play for the pivot shaft 38 in a well known manner.

The pivot shaft 38 carries the indicating pointer 3 at its upper end. A generally rectangular armature 41 is pressed on the pivot shaft 38 in a horizontal plane in alignment with the pole pieces 35 and 36 and the matching pole piece 7. The armature 41 may be made from any suitable magnetic material. A weight 42 is secured to the pivot shaft 38 immediately below the armature 41 to counterbalance the unbalance of the shaft 38 caused by the indicating pointer 3 and to afford a zero return for the pointer.

The internal flux path for magnetic flux produced by current flowing in the coils 14 and 15 is provided in part by the core elements 31 and 32. A pair of soft iron partially threaded screws 43 and 44 are inserted into the bores 33 and 34 of the coil forms 16 and 17 from the right hand ends (Fig. 1). The screws 43 and 44 mesh with and are held in place by an elongated biasing spring 45 which is held in place under tension by a generally triangular rib 47 on the frame 6. As indicated above, the uppermost sections of the coil form projections 18 and 19 have been cut away. This permits the spring 45 to bear directly on the screws 43 and 44 and on the projections 18 and 19. Thus, both the projections and the screws are effectively prevented from turning during use. The spring 45 is made of a suitable nonmagnetic spring material.

It can be seen in Fig. 4 that there are small annular air gaps 48 and 49 between the adjusting screws 43, 44 and the magnetic frame 6. The radial distance of the air gap is equivalent to the thickness of the nylon projections 18 and 19. It can be seen that these air gaps 48 and 49 are constant and may be made of an optimum distance, for example .015" in one application.

By threading the calibrating screws 43 and 44 toward or away from the core elements 31 and 32 variable internal gaps 50 and 51 are adjusted. By adjusting the air gaps 50 and 51, calibration of the gauge 1 will be effected.

The gauge 1 may be connected in a well known manner, for example in the manner shown at page 84 of Motor's Auto Repair Manual, 19th Edition, published in 1956 by Motor. Briefly, one of the coils 14 or 15 is connected across a source of D.C. potential. The other coil is connected across the same source of D.C. potential by way of a series connected variable resistance. Thus, as the resistance connected in series with the other coil is increased or decreased the current flowing through the other coil will become substantially lower or higher but always less than the current in the one coil.

The current in the one coil will produce a constant magnetic flux which will follow magnetic path including its respective stationary core element 31 or 32 and element 29 or 30, the air gap 37 and the armature 41, the pole piece 7, the frame 6, and the adjustable screw 43 or 44. This magnetic flux will tend to align the armature 41 with a respective pole piece 35 or 36.

The current flowing in the other coil will cause magnetic flux to flow through a similar respective flux path tending to urge the armature 41 to align itself with its respective pole piece 35 or 36. However, inasmuch as the current in the second mentioned coil produces a flux of lower intensity than that produced by the one coil and of an intensity determined by the instantaneous value of the series connected resistance, the forces produced by the flux act on the armature 41 to cause it to assume a position angularly displaced from its aligned position with the pole piece of the first mentioned coil. The amount of displacement is determined by and proportional to the force produced by the magnetic flux of the other coil.

As is well known in the art, variations in the potential of the D.C. source will equally effect the current in each coil and consequently will introduce no error in the reading of the gauge.

What is claimed is:

1. An electric meter mechanism comprising: a generally U-shaped magnetic frame including a common arcuate pole piece on one side thereof; a nonmagnetic bracket including a base section attached to the base of the frame, a midsection disposed at a right angle to the base section and generally parallel to the sides of the frame, and a third section generally parallel to the base section extending from the end of the midsection opposite the end to which the base is connected in the direction toward the one side of the frame; a pair of individual arcuate pole pieces rigidly secured to the midsection of the bracket in circumferential alignment with the common pole piece to define a generally circular air gap therebetween; a magnetic armature pivoted between the base of the frame and the third bracket section for movement in the air gap; a pair of core elements supported by the midsection of the bracket, each connected in substantially low reluctance magnetic relation with a respective individual pole piece; a pair of electromagnetic coils supported by the core elements and the other side of the frame between said other frame side and the midsection of the bracket; and a second pair of core elements extending within the coils and connected in substantially low reluctance magnetic relation with the other side of the frame, one of the core element pairs being disposed for individual adjustment toward and away from the other pair of core elements to define a desired gap therebetween for calibration purposes.

2. An electric instrument mechanism comprising: a generally U-shaped magnetic frame including a common arcuate pole piece on one side thereof; a nonmagnetic bracket including a base section attached to the base of the frame, a midsection disposed at right angles to the base section and generally parallel to the sides of the frame, and a third section generally parallel to the base section extending from the end of the midsection opposite the end to which the base is connected in the direction toward the one side of the frame; a pair of individual arcuate pole pieces rigidly secured to the midsection of the bracket in circumferential alignment with the common pole piece to define a generally circular air gap therebetween; a magnetic armature pivoted between the base of the frame and the third bracket section for movement in the air gap; a first pair of core elements supported by the midsection of the bracket, each connected substantially in magnetic conducting relation with a respective individual pole piece; a pair of electromagnetic coils supported by the core elements and the other side of the frame between said other frame side and the midsection of the brackets; and a second pair of core elements extending within the coils, disposed for adjustment toward and away from the other pair of core elements to define a desired gap therebetween for calibration purposes, and disposed in predetermined close proximity to the other side of the frame to define an air gap therebetween for minimizing magnetic lag.

3. The combination claimed in claim 2 wherein the adjustable core elements are threaded at their portions which are adjacent the other side of the frame, and an elongated spring held in biased engagement against the threads to retain the adjustable core elements in their adjusted positions.

4. In a meter movement of the type in which a common pole piece and a pair of individual pole pieces disposed generally diametrically opposite the common pole piece define an air gap therebetween, in which an electromagnetic coil is provided for each individual pole piece to produce flux in the individual pole piece, the air gap, and the common pole piece as a function of the current passing therethrough, and in which a magnetic armature is pivoted for movement in the air gap in accordance with the relative amount of flux produced by each of the coils, the combination with the coils and pole pieces of a flux path assembly comprising first and second core elements in each coil disposed for calibrating movement of one of the elements toward and away from the other to define an air gap of desired length therebetween, non-permanent magnetic structure connecting one of the core elements of each coil in substantially low reluctance relation with its respective individual pole piece and the other core element of each coil in substantially low reluctance magnetic relation with the common pole piece whereby the air gap between the cores further reduces the retentivity of the flux path assembly to minimize magnetic lag.

5. In a meter movement of the type in which a common arcuate pole piece and a pair of individual arcuate pole pieces disposed generally diametrically opposite the common pole piece define a generally circular air gap, in which an electromagnetic coil is provided for each individual pole piece to produce flux in the individual pole piece, the air gap, and the common pole piece as a function of the current passing therethrough, and in which a magnetic armature is pivoted for movement in the air gap in accordance with the relative amount of flux produced by each of the coils, the combination with the coils and pole pieces of a flux path assembly comprising first and second core elements in each coil disposed for calibrating movement of one of the elements toward and away from the other to define a calibrating air gap of desired length therebetween, and non-permanent magnetic structure connecting one of the core elements of each coil in substantially low reluctance relation with its respective individual pole piece and the other core element of each coil in substantially low reluctance magnetic relation with the common pole piece, whereby the air gap between the cores reduces the retentivity of the flux path assembly to reduce magnetic lag.

6. The combination of claim 5 wherein the flux path assembly includes at least one additional short length, low reluctance air gap spaced from the circular air gap and from the calibrating air gaps to minimize magnetic lag.

7. An electromagnetic indicating instrument comprising a pair of individual arcuate pole pieces and a common pole piece disposed diametrically opposite the individual pole pieces to define a generally circular air gap therebetween, a magnetic armature mounted for rotation in and substantially coaxial with the air gap, a pair of electrical coils each mounted adjacent a respective individual pole piece, first and second core elements in each coil disposed for calibrating movement of one of the elements toward and away from the other to define an air gap of a desired short length therebetween, and non-permanent magnetic structure connecting one of the core elements of each coil in substantially low reluctance magnetic relation with the respective individual pole piece and the other core element of each coil in substantially low reluctance magnetic relation with the common pole piece, whereby the magnetic lag of the instrument is substantially lowered without appreciably affecting torque.

8. An electromagnetic indicating instrument comprising a pair of individual arcuate pole pieces and a common pole piece disposed diametrically opposite the individual pole pieces to define a generally circular air gap therebetween, a magnetic armature mounted for rotation in and substantially coaxial with the air gap, a pair of electrical coils each mounted adjacent a respective individual pole piece, first and second core elements in each coil disposed for calibrating movement of one of the elements toward and away from the other to define an air gap of desired short length therebetween, non-permanent magnetic structure connecting one of the core elements of each coil in substantially low reluctance magnetic relation with its respective individual pole piece, and non-permanent magnetic structure magnetically connecting the common pole piece to the other core element of each coil through an air gap of a short length not substantially affecting the instrument torque, whereby the magnetic lag of the instrument is minimized.

References Cited in the file of this patent
UNITED STATES PATENTS

| | | |
|---|---|---|
| 1,282,497 | Trent | Oct. 22, 1918 |
| 1,696,333 | Shire | Dec. 25, 1928 |
| 2,040,060 | Middleton | May 5, 1936 |
| 2,127,427 | Scheldorf | Aug. 16, 1938 |
| 2,507,801 | Middleton | May 16, 1950 |